United States Patent
Nakajima (10) Patent No.: US 8,952,914 B2
(45) Date of Patent: Feb. 10, 2015

(54) TOUCH INPUT DEVICE

(71) Applicant: Fujitsu Component Limited, Tokyo (JP)

(72) Inventor: Takashi Nakajima, Tokyo (JP)

(73) Assignee: Fujitsu Component Limited, Tokyo (JP)

( * ) Notice: Subject to any disclaimer, the term of this patent is extended or adjusted under 35 U.S.C. 154(b) by 94 days.

(21) Appl. No.: 13/798,726

(22) Filed: Mar. 13, 2013

(65) Prior Publication Data

US 2013/0265249 A1 Oct. 10, 2013

(30) Foreign Application Priority Data

Apr. 9, 2012 (JP) .................................. 2012-088212

(51) Int. Cl.
*G06F 3/041* (2006.01)
(52) U.S. Cl.
CPC ....................................... *G06F 3/041* (2013.01)
USPC ............ 345/173; 345/178; 345/163; 345/156

(58) Field of Classification Search
None
See application file for complete search history.

(56) References Cited

U.S. PATENT DOCUMENTS

| 8,786,576 B2 * | 7/2014 | Jung et al. ..................... 345/175 |
| 2005/0030292 A1 | 2/2005 | Diederiks |
| 2009/0201289 A1 * | 8/2009 | Kim et al. ..................... 345/419 |
| 2012/0032916 A1 | 2/2012 | Enoki |

FOREIGN PATENT DOCUMENTS

| JP | 2004-94450 | 3/2004 |
| JP | 2005-512241 | 4/2005 |
| JP | 2010-244772 | 10/2010 |
| JP | 2011-141796 | 7/2011 |

OTHER PUBLICATIONS

Patent Abstracts of Japan, Publication No. 2010-244772, Published Oct. 28, 2010.
Patent Abstracts of Japan, Publication No. 2004-094450, Published Mar. 25, 2004.
Patent Abstracts of Japan, Publication No. 2011-141796, Published Jul. 21, 2011.

* cited by examiner

*Primary Examiner* — Muhammad N Edun
(74) *Attorney, Agent, or Firm* — Staas & Halsey LLP (57) ABSTRACT

A touch input device includes: a touch surface that has a three-dimensional structure, and identifies a touch coordinate of a point touched by an object; and a controller that defines a first direction in the touch surface as a first direction in an output coordinate, and outputs information about the output coordinate, wherein the three-dimensional structure has a size and a height at least one of which is changed so that the first direction in the touch surface and a second direction in the touch surface intersecting with the first direction in the touch surface can be recognized.

5 Claims, 11 Drawing Sheets

TOUCH INPUT DEVICE

CROSS-REFERENCE TO RELATED APPLICATION

This application is based upon and claims the benefit of priority of the prior Japanese Patent Application No. 2012-088212, filed on Apr. 9, 2012, the entire contents of which are incorporated herein by reference.

FIELD

A certain aspect of the embodiments discussed herein is related to a touch input device.

BACKGROUND

In recent years, the expansion of the market of information communication devices and business terminals expands a demand for touch input devices such as touch panels and touch pads capable of easily detecting coordinates. There has been known a touch input device having a three-dimensional structure in a touch surface as disclosed in Japanese Patent Application Publication Nos. 2010-244772, 2004-94450, 2005-512241, and 2011-141796.

SUMMARY

According to an aspect of the present invention, there is provided a touch input device including: a touch surface that has a three-dimensional structure, and identifies a touch coordinate of a point touched by an object; and a controller that defines a first direction in the touch surface as a first direction in an output coordinate, and outputs information about the output coordinate, wherein the three-dimensional structure has a size and a height at least one of which is changed so that the first direction in the touch surface and a second direction in the touch surface intersecting with the first direction in the touch surface can be recognized.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described previously, there has been known a touch input device having a three-dimensional structure in a touch surface. However, a user has difficulty in recognizing a direction of the touch surface when he/she touches the three-dimensional structure.

Hereinafter, a description will be given of embodiments of the present invention with reference to the drawings.

[First Embodiment]

Figure 1:
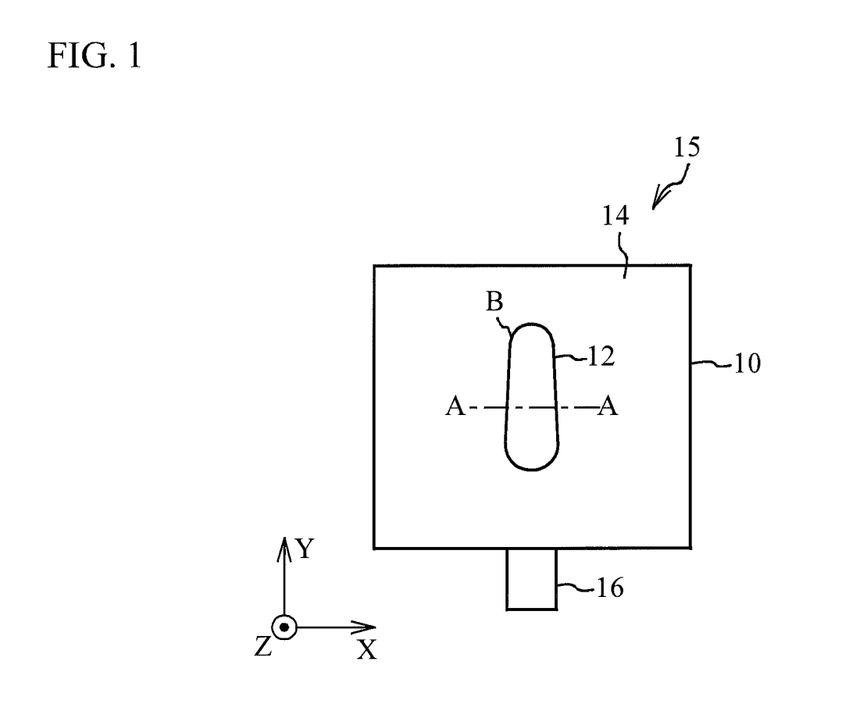
FIG. 1 is a plan view of a touch portion of a touch input device in accordance with a first embodiment.

FIG. 1 is a plan view of a touch portion of a touch input device in accordance with a first embodiment. A touch surface 10 that is an upper surface of a touch portion 15 includes a three-dimensional structure 12 and a flat portion 14. A cable 16 for inputting and outputting signals is coupled to the touch portion 15. The three-dimensional structure 12 is, for example, a bulging portion bulging upward.

Figure 2:
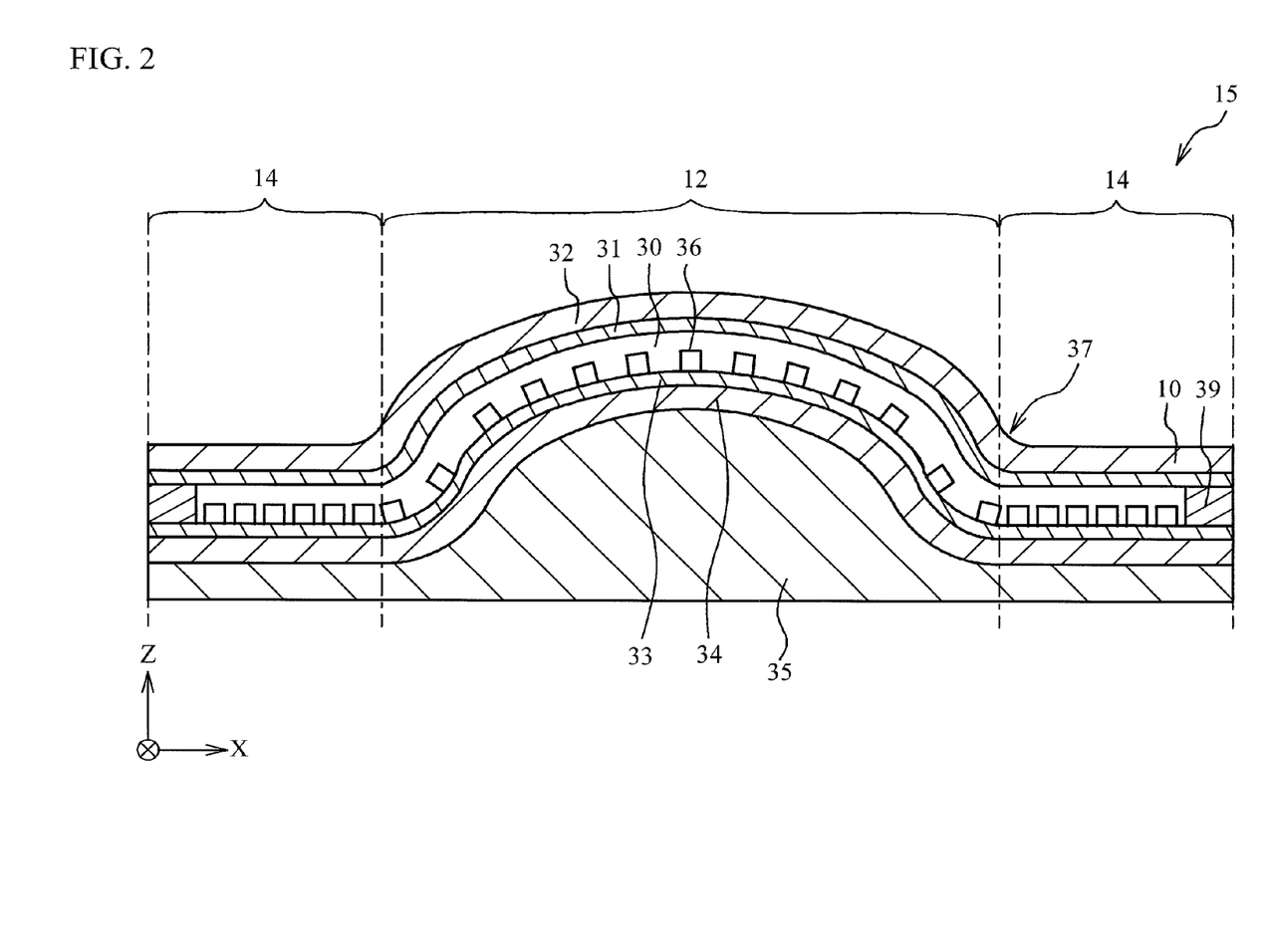
FIG. 2 is a cross-sectional view taken along line A-A in FIG. 1.

FIG. 2 is a cross-sectional view taken along line A-A in FIG. 1. The touch portion 15 is formed by stacking a resin pedestal 35, a lower film 34, a lower conductive film 33, dot spacers 36, an upper conductive film 31, and an upper film 32. The lower film 34 is located on the resin pedestal 35, and the lower conductive film 33 is located on the lower film 34. A film may be used instead of the resin pedestal 35. The dot spacers 36 are located apart from each other, and the upper conductive film 31 is located apart from the dot spacers 36. The lower conductive film 33 and the upper conductive film 31 are attached to each other by an adhesive member 39. An air-space 30 is formed between the lower conductive film 33 and the upper conductive film 31.

The resin pedestal 35 is made of a material such as plastic that hardly deforms. The lower film 34 and the upper film 32 are, for example, transparent films, and may be made of polyethylene terephthalate. The lower conductive film 33 and the upper conductive film 31 are, for example, transparent conductive films, and may be made of ITO (indium tin oxide). The dot spacers 36 are, for example, insulative materials, and may be made of an acrylic resin. The adhesive member 39 is a double-sided tape for example.

The upper conductive film 31 normally does not contact with the lower conductive film 33 in the touch portion 15. When an object such as a finger touches the upper film 32, the upper film 32 and the upper conductive film 31 sag. The upper conductive film 31 contacts with the lower conductive film 33 through a gap between the dot spacers 36. Touch coordinates of the touch surface 10 to which the object touches can be detected by detecting a position where the upper conductive film 31 contacts with the lower conductive film 33.

The gap between the dot spacers 36 in the flat portion 14 is narrower than that in the three-dimensional structure 12. This configuration allows the lower conductive film 33 to easily contact with the upper conductive film 31 in the three-dimensional structure 12 and allows the lower conductive film 33 to hardly contact with the upper conductive film 31 in the flat portion 14 when an object such as a finger touches. The dot spacers 36 may be located on at least one of an upper surface of the lower conductive film 33 and a lower surface of the upper conductive film 31.

The upper film 32 and the upper conductive film 31 have a curved part 37 in a boundary B between the flat portion 14 and the three-dimensional structure 12. This structure can reduce a stress at the boundary B (see FIG. 1), and suppress the damage to the upper film 32 and the upper conductive film 31 due to the stress.

Figure 3:
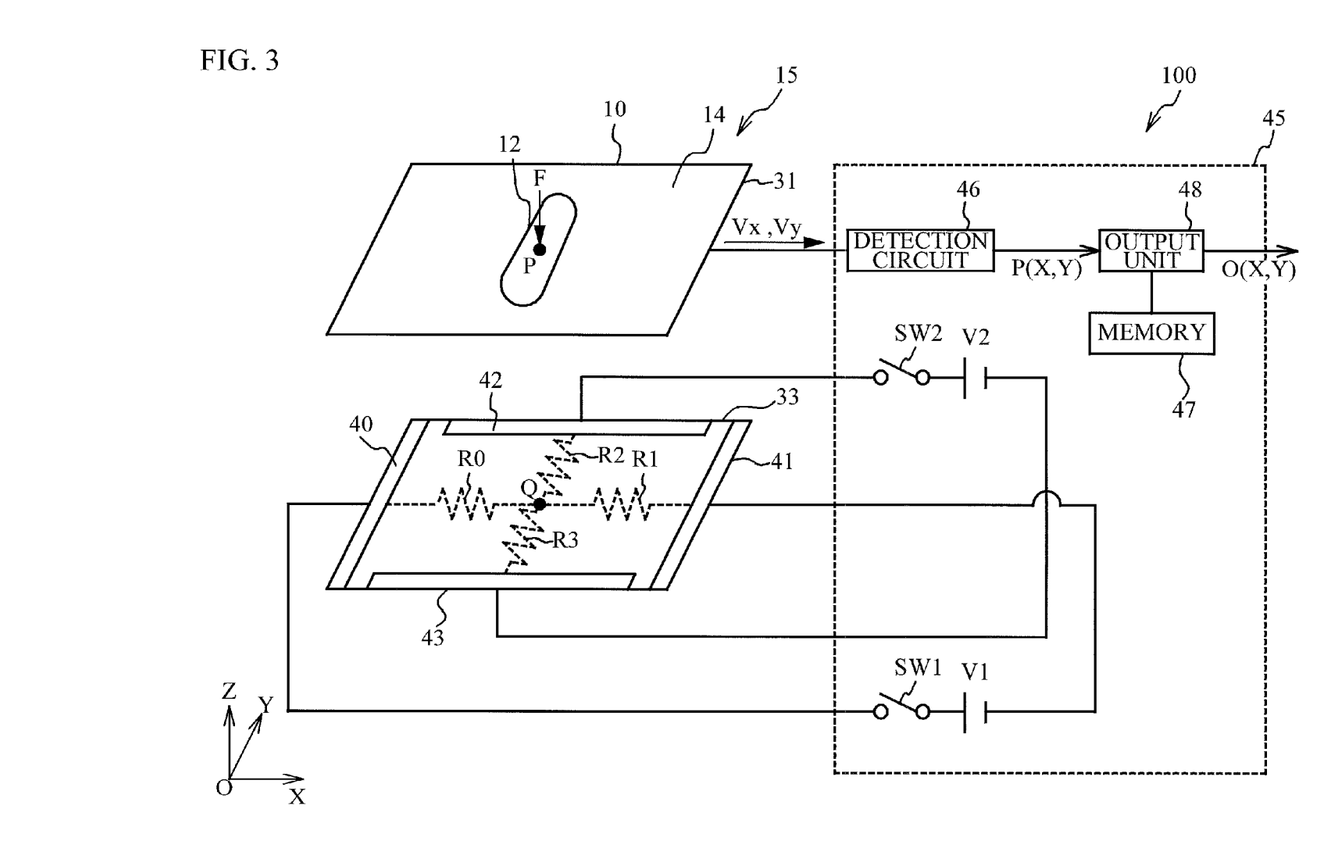
FIG. 3 is a diagram illustrating the touch input device of the first embodiment.

FIG. 3 is a diagram illustrating the touch input device in accordance with the first embodiment. A touch input device 100 includes the touch portion 15 and a controller 45. A description will be given of the upper conductive film 31 and the lower conductive film 33 out of the stacked structure of the touch portion 15 illustrated in FIG. 2. The upper conductive film 31 and the lower conductive film 33 are illustrated separately. The lower conductive film 33 includes X electrodes 40 and 41 facing each other in an X direction and Y electrodes 42 and 43 facing each other in a Y direction.

The controller 45 includes a detection circuit 46, an output unit 48, a memory 47, switches SW1 and SW2, and power sources V1 and V2. The power source V1 applies a direct voltage between the X electrodes 40 and 41. The switch SW1 is located between the power source V1 and the X electrode 40 or 41. The power source V2 applies a direct voltage between the Y electrodes 42 and 43. The switch SW2 is located between the power source V2 and the Y electrode 42 or 43. The detection circuit 46 detects touch coordinates P (X, Y) of a point touched by an object. The output unit 48 converts the touch coordinates P (X, Y) to output coordinates O (X, Y), and outputs them to another device.

As described above, the touch surface 10 has the three-dimensional structure 12, and identifies the touch coordinates P (X, Y) of a point touched by an object. The controller 45 defines a first direction (e.g. X direction) in the touch surface 10 as a first direction (e.g. X direction) of the output coordinates O (X, Y), and outputs information about the output coordinates. At this point, the X direction and the Y direction in the touch coordinates may be converted into the X direction and the Y direction in the output coordinates, but the X direction and the Y direction in the output coordinates may fail to correspond to the X direction and the Y direction in the touch coordinates. For example, the X direction in the output coordinates may be an arbitrary direction in the touch coordinates. In this case, the first direction in the touch surface 10 is a direction corresponding to the X direction in the output coordinates O (X, Y).

A description will be given of a case where an object touches the touch surface 10 and a stress F is applied to the coordinates P of the touch surface 10. The lower conductive film 33 electrically contacts with the upper conductive film 31 at a point Q in the lower conductive film 33. First, the switch SW2 is turned OFF, and the switch SW1 is turned ON. A voltage V1 is applied between the X electrodes 40 and 41. The lower conductive film 33 is divided into resistors R0 and R1 in the X direction at the point Q. Thus, the electric potential of the upper conductive film 31 has a voltage Vx that is a resistively divided voltage of the voltage V1 by the resistors R0 and R1. The detection circuit 46 detects an X coordinate of the coordinates P from the voltage Vx. Then, the switch SW1 is turned OFF, and the switch SW2 is turned ON. A voltage V2 is applied between the Y electrodes 42 and 43. The lower conductive film 33 is divided into resistors R2 and R3 in the Y direction at the point Q. Thus, the electric potential of the upper conductive film 31 has a voltage Vy that is a resistively divided voltage of the voltage V2 by the resistors R2 and R3. The detection circuit 46 detects a Y coordinate of the coordinates P from the voltage Vy. As described above, the touch coordinates of a point in the touch surface 10 touched by an object can be detected. The output unit 48 converts the touch coordinates P (X, Y) into the output coordinates O (X, Y), and outputs them to another device.

Figure 4A:
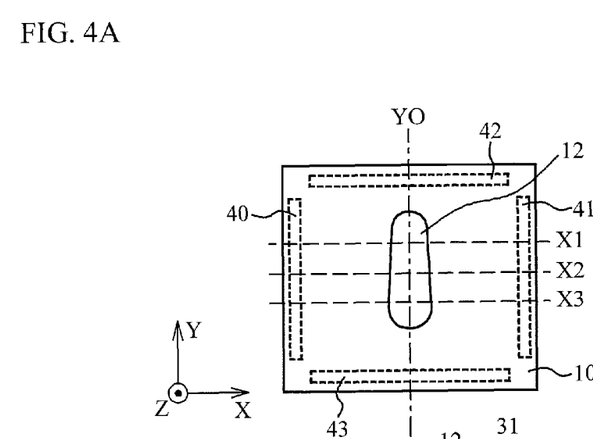
FIG. 4A through FIG. 4C are diagrams illustrating a three-dimensional structure.
Figure 4B:
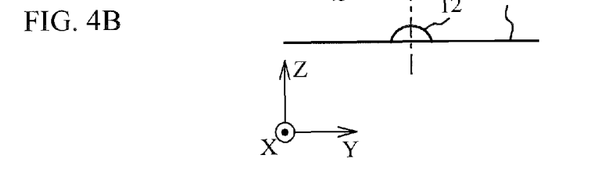
Figure 4C:
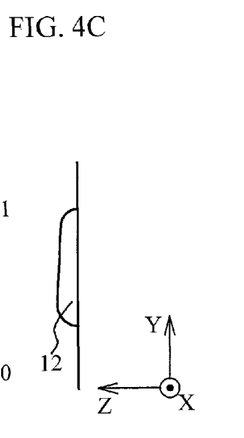

FIG. 4A through FIG. 4C are diagrams illustrating the three-dimensional structure. FIG. 4A is a plan view, and FIG. 4B and FIG. 4C are side views. As illustrated in FIG. 4A through FIG. 4C, the three-dimensional structure 12 has a width in the X direction that narrows toward a positive direction in the Y direction. In addition, the three-dimensional structure 12 has a height that decreases toward the positive direction in the Y direction. For example, the three-dimensional structure 12 is asymmetric with respect to all axes X1 through X3 in the X direction.

Figure 5:
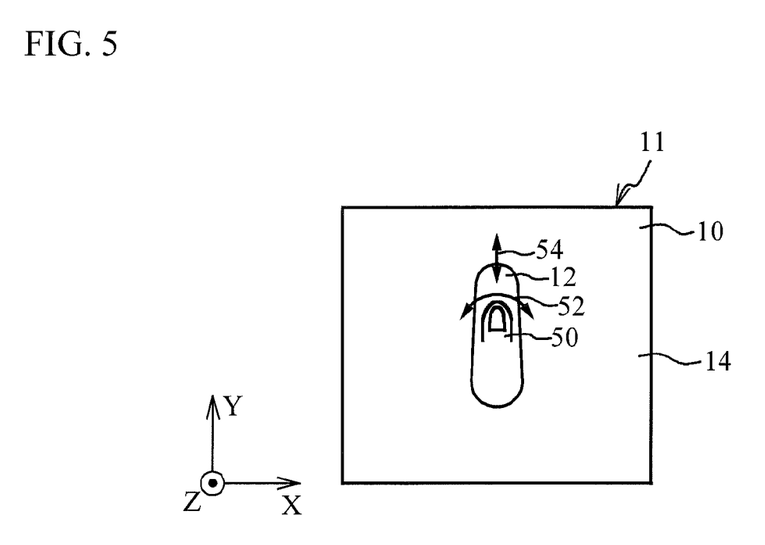
FIG. 5 is a diagram illustrating a case where the three-dimensional structure is touched by a finger.

FIG. 5 is a diagram illustrating a case where the three-dimensional structure is touched by a finger. As illustrated in FIG. 5, a user can touch the three-dimensional structure 12 in a Y direction 54 and an X direction 52 by a finger 50. Thus, the user can intuitively recognize the X direction and the Y direction by feel of the finger 50 without visually confirming the touch portion 15.

The first embodiment changes the size and height of the three-dimensional structure 12 so that a user can recognize the X direction (first direction) in the touch surface 10 and the Y direction (second direction) in the touch surface 10 intersecting with the X direction in the touch surface 10. This configuration allows a user to recognize the X direction by touching by a finger. For example, the user can recognize the X direction by the finger in a dark place. Furthermore, the user can also recognize the Y direction and a Z direction. In FIG. 4A through FIG. 4C, the size (e.g. width) and the height are changed, but at least one of the size and the height may be changed. The first direction of the touch surface 10 may not be the X direction (direction between the electrodes 40 and 41). The controller 45 may define a direction corresponding to the first direction of the output coordinates (e.g. X direction of a display device) as the first direction of the touch surface 10, and a direction intersecting the first direction as the second direction. In this case, it is sufficient if the three-dimensional structure allows the first direction to be recognized. This is applicable to embodiments hereinafter.

For example, the three-dimensional structure 12 is configured to be asymmetric with respect to all axes extending in the X direction in the touch surface (e.g. X1 through X3). This configuration allows a user to intuitively recognize the X direction. In addition, the three-dimensional structure 12 may be configured to be symmetric with respect to an axis Y0 extending in the Y direction perpendicular to the X direction in the touch surface 10.

In FIG. 5, the gap between the dot spacers 36 in the flat portion 14 may be made narrow so that the lower conductive film 33 does not contact with the upper conductive film 31 in the flat portion 14. This configuration can suppress an erroneous operation due to a touch to the flat portion 14.

[Second Embodiment]

Figure 6:
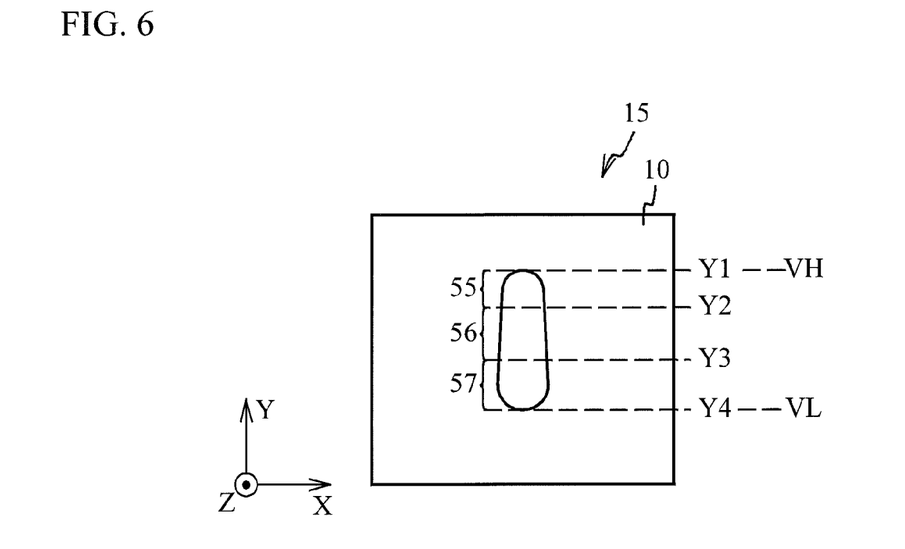
FIG. 6 is a plan view of a touch portion of a touch input device in accordance with a second embodiment.

FIG. 6 is a plan view of a touch portion of a touch input device in accordance with a second embodiment. The three-dimensional structure 12 is divided into regions 55, 56 and 57. A voltage at a first end in the Y direction of the three-dimensional structure 12 is assumed to be VH, and a voltage at a second end is assumed to be VL. The Y coordinate of the region 55 is from Y1 to Y2, the Y coordinate of the region 56 is from Y2 to Y3, and the Y coordinate of the region 57 is from Y3 to Y4.

Figure 7:
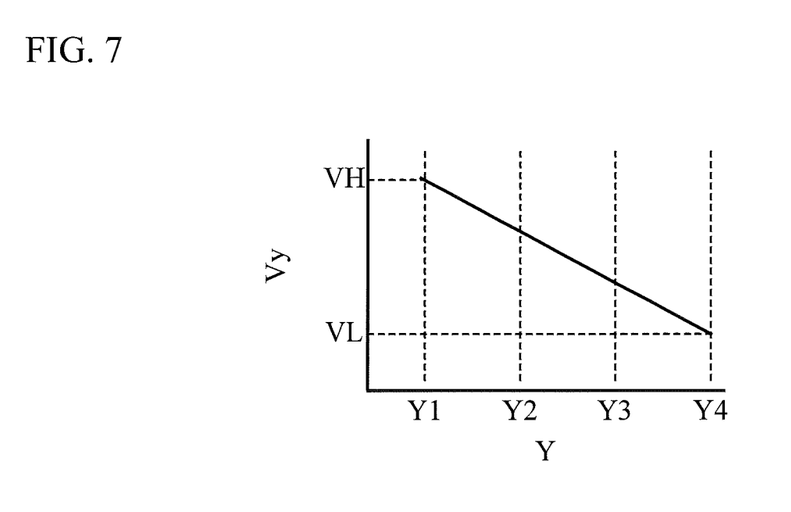
FIG. 7 is a diagram illustrating a detection voltage with respect to a Y coordinate of a point touched by an object.

FIG. 7 is a diagram illustrating a detection voltage with respect to the Y coordinate of a point touched by an object. As illustrated in FIG. 7, the voltage Vy uniformly changes with respect to the Y coordinate of the point touched by the object. FIG. 8A through FIG. 8D are diagrams illustrating a movement amount with respect to the Y coordinate of the point touched by the object. Here, the movement amount is a movement amount of a cursor in a display device coupled to the touch input device 100 for example. That is to say, it is an amount of movement of a coordinate in the output coordinates when a coordinate moves a certain distance in the touch coordinates. When the movement amount is large, the coordinate in the output coordinates moves largely even though the object moves a small amount on the touch surface 10.

Figure 8A:
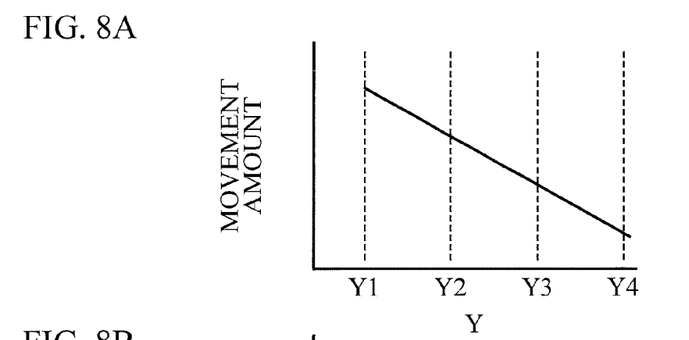
FIG. 8A through FIG. 8D are diagrams illustrating a movement amount with respect to a Y coordinate of a point touched by the object.
Figure 8B:
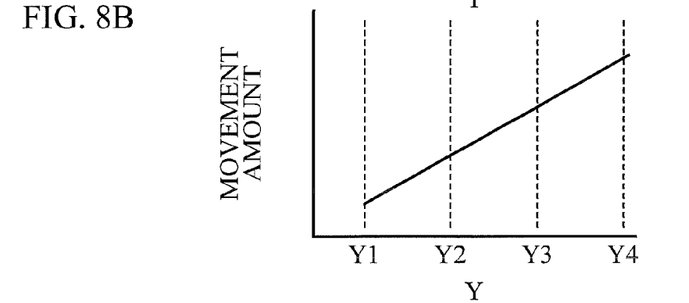
Figure 8C:
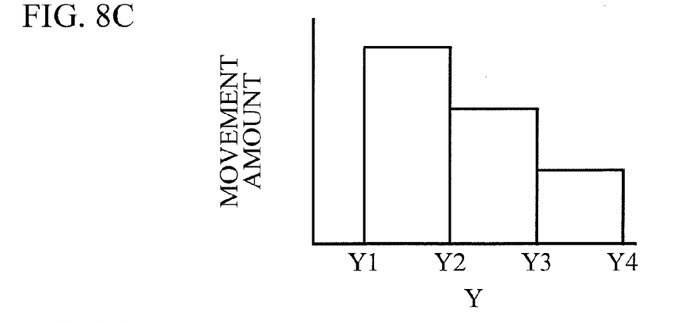
Figure 8D:
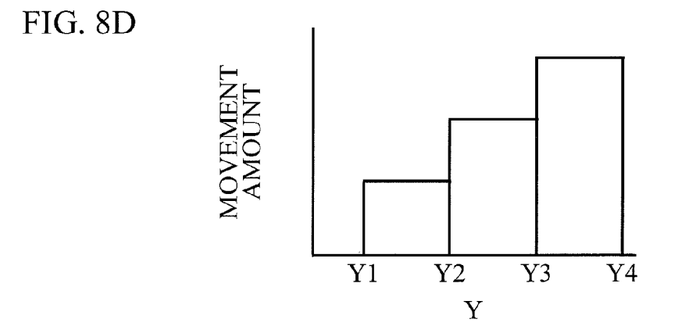

As illustrated in FIG. 8A, the movement amount can be uniformly increased as the Y coordinate of the point touched by the object comes closer to a tip of a finger (positive direction of Y). As illustrated in FIG. 8B, the movement amount can be uniformly decreased as the Y coordinate of the point touched by the object comes closer to the tip of the finger. As illustrated in FIG. 8C, the movement amount can achieve a stepwise change so that the movement amount decreases as the point touched by the object moves from the region 55 to 57. As illustrated in FIG. 8D, the movement amount can achieve a stepwise change so that the movement amount increases as the point touched by the object moves from the region 55 to 57. In FIG. 8A and FIG. 8B, the movement amount with respect to the Y coordinate may be a curved line instead of a straight line. In FIG. 8C and FIG. 8D, it is sufficient if the region is divided into two or more regions.

Figure 9:
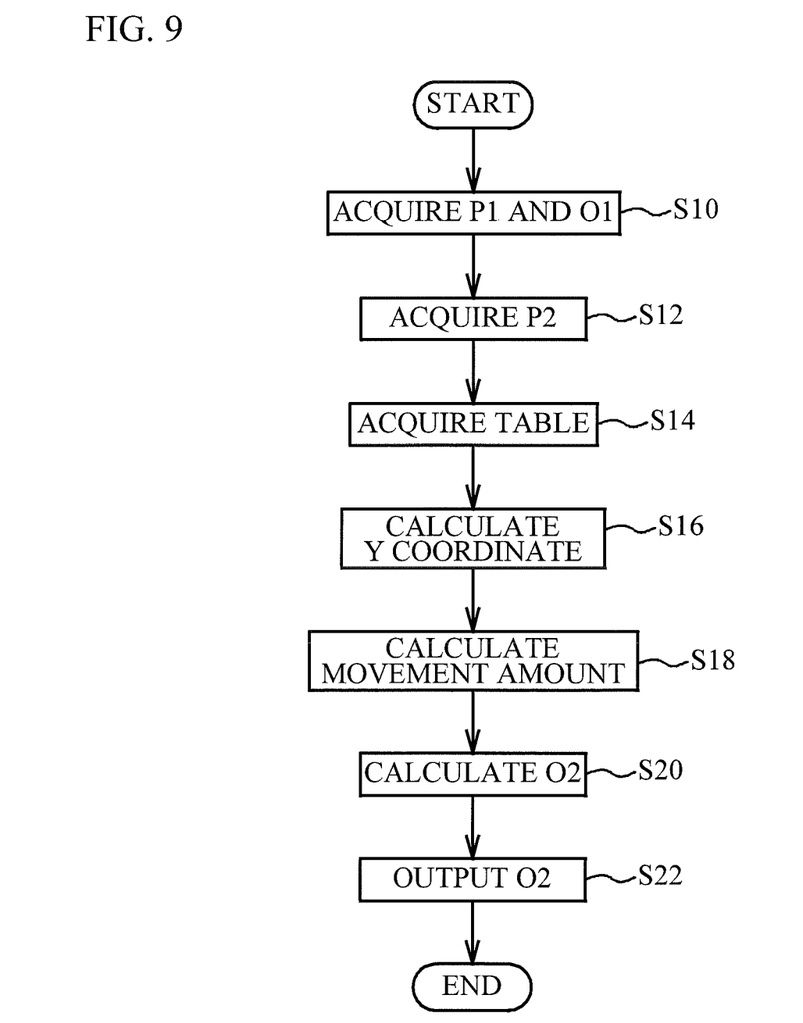
FIG. 9 is a flowchart illustrating a process executed by an output unit.

A description will be given of a control by the output unit 48. FIG. 9 is a flowchart illustrating a process executed by the output unit. The memory 47 stores a table such as the tables illustrated in FIG. 8A through FIG. 8D. In addition, the memory 47 stores previous touch coordinates P1 and previous output coordinates O1. The output unit 48 acquires the previous touch coordinates P1 and the previous output coordinates O1 from the memory 47 (step S10). The output unit 48 acquires a current touch coordinates P2 from the detection circuit 46 (step S12). The output unit 48 acquires the table such as the tables illustrated in FIG. 8A through FIG. 8D from the memory 47 (step S14). The output unit 48 calculates a Y coordinate from the current touch coordinates P2 (step 16). The Y coordinate may be calculated from the touch coordinates P1 instead of P2, or may be calculated based on the touch coordinates P1 and P2 (for example, the average value of Y coordinates of P1 and P2). The output unit 48 calculates a movement amount from the table and the calculated Y coordinate (step S18). The output unit 48 adds a value obtained by multiplying a difference between the touch coordinates P2 and P1 by the calculated movement amount to the previous output coordinates O1 to calculate this time's output coordinates O2 (step S20). The output unit 48 outputs this time's output coordinates O2 (step S22). As described above, the output unit 48 determines the movement amount from the output coordinates O1 to O2 based on the Y coordinates of the touch coordinates P1 and/or P2.

Figure 10A:
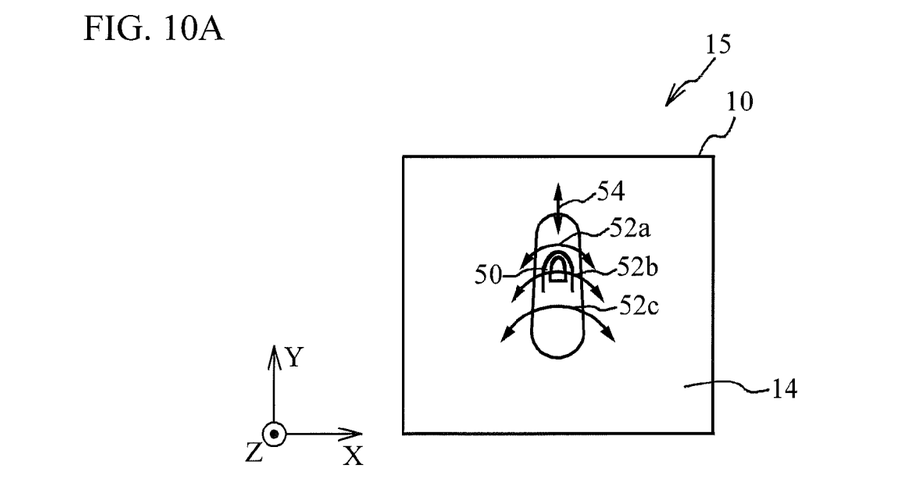
FIG. 10A is a plan view of a touch portion.
Figure 10B:
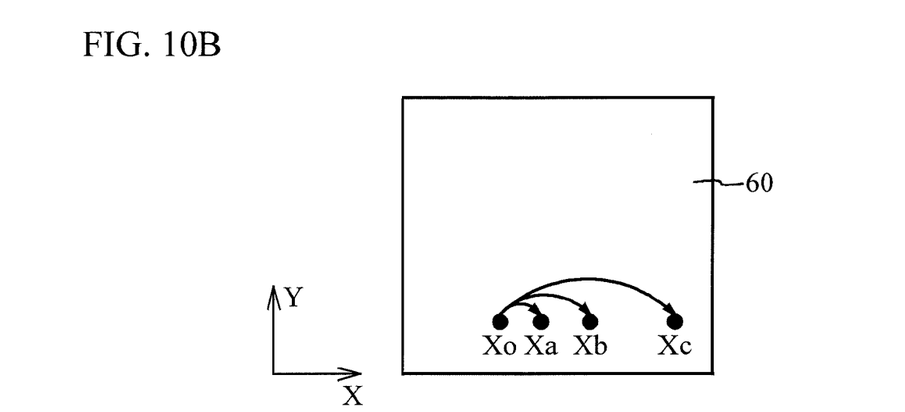
FIG. 10B is a diagram illustrating a screen of a display device.

FIG. 10A is a plan view of a touch portion, and FIG. 10B is a diagram illustrating a screen of a display device. As illustrated in FIG. 10A, an object such as the finger 50 is moved in the X direction. At this time, arrows 52a through 52c have different Y coordinates. As illustrated in FIG. 10B, a cursor exists at coordinates Xo on a screen 60 of the display device. A finger is moved a certain distance along the arrows 52a through 52c illustrated in FIG. 10A. As illustrated in FIG. 10B, the positions of the cursor become Xa through Xc when the finger is moved along the arrows 52a through 52c respectively. As illustrated, the movement distance on the display screen differs depending on the Y coordinate in the touch surface 10.

The second embodiment configures the controller 45 to change the movement amount in the first direction (e.g. X direction) of the output coordinates depending on the position of the touch coordinates in the second direction (e.g. Y direction) of the touch surface 10. As described above, a user can recognize the second direction by touching by the finger, and can change the movement amount by the position in the second direction. As the movement amount can be changed, the use according to a case where the cursor is frequently moved and a case where the cursor is slowly moved becomes possible.

The controller 45 can increase the movement amount as the position of the touch coordinates moves toward one direction in the second direction. This configuration allows a user to sensuously set the movement amount by the position in the second direction without visually confirming the touch portion 15.

In addition, the three-dimensional structure 12 has a width in the first direction (X direction) that narrows toward one direction in the second direction (e.g. positive direction in the Y direction). For example, a user can move a cursor quickly in a position where the width is narrow, and move the cursor slowly in a position where the width is wide, and thus the user can sensously set the movement amount without visually confirming the touch portion 15.

In the case of FIG. 8C and FIG. 8D, one width of the three-dimensional structure 12 corresponds to, for example, a movement amount of one button of the display screen in a region where the movement amount is small. One width of the three-dimensional structure 12 corresponds to, for example, a movement amount of five buttons of the display screen in a region where the movement amount is large. As described above, the number of buttons through which the cursor moves can be determined depending on in which region of the regions 55 through 57 the finger is moved through one width of the three-dimensional structure 12.

[Third Embodiment]

Figure 11:
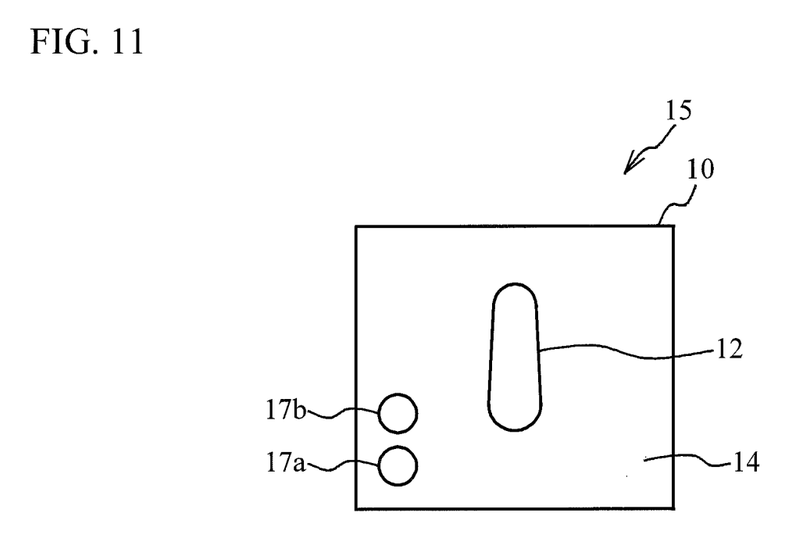
FIG. 11 is a plan view illustrating a touch portion of a touch input device in accordance with a third embodiment.

FIG. 11 is a plan view illustrating a touch portion of a touch input device in accordance with a third embodiment. Switches 17a and 17b are located in the touch surface 10 in addition to the three-dimensional structure 12. The gap between the dot spacers 36 is wide in the switches 17a and 17b, and a touch of an object can be detected. For example, the switch 17a can be configured to be a switch for reducing a movement amount, and the switch 17b can be configured to be a switch for increasing a movement amount. In addition, the switches 17a and 17b may be configured to be switches for decreasing or increasing brightness of the display screen. As described above, the switches 17a and 17b can have various applications. One or more switches may be provided.

The first through third embodiments mainly describe a touch panel, but are applicable to a touch pad. In addition, a 5-wire resistive touch panel is described, but the first through third embodiments are applicable to a touch panel or touch pad of another type such as a capacitive touch panel or touch pad.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A touch input device comprising:
a touch surface that has a three-dimensional structure, and identifies a touch coordinate of a point touched by an object; and
a controller that defines a first direction in the touch surface as a first direction in an output coordinate, and outputs information about the output coordinate,
wherein the three-dimensional structure has a size and a height at least one of which is changed so that the first direction in the touch surface and a second direction in the touch surface intersecting with the first direction in the touch surface can be recognized, and
wherein the three-dimensional structure is asymmetric with respect to all axes extending in the first direction in the touch surface.

2. The touch input device of claim 1,
wherein the three-dimensional structure is symmetric with respect to an axis extending in the second direction perpendicular to the first direction in the touch surface.

3. A touch input device comprising:
a touch surface that has a three-dimensional structure, and identifies a touch coordinate of a point touched by an object; and
a controller that defines a first direction in the touch surface as a first direction in an output coordinate, and outputs information about the output coordinate,
wherein the three-dimensional structure has a size and a height at least one of which is changed so that the first direction in the touch surface and a second direction in the touch surface intersecting with the first direction in the touch surface can be recognized, and
wherein the controller changes a movement amount in the first direction of the output coordinate depending on a position of the touch coordinate in the second direction of the touch surface.

4. The touch input device of claim 3,
wherein the controller increases the movement amount as the position of the touch coordinate moves toward one direction in the second direction.

5. The touch input device of claim 4,
wherein a width of the three-dimensional structure narrows toward the one direction.

\* \* \* \* \*